United States Patent [19]

Wallace

[11] Patent Number: 4,889,765
[45] Date of Patent: Dec. 26, 1989

[54] INK-RECEPTIVE, WATER-BASED, COATINGS

[75] Inventor: John L. Wallace, Allentown, Pa.

[73] Assignee: W. R. Grace & Co., Lexington, Mass.

[21] Appl. No.: 136,264

[22] Filed: Dec. 22, 1987

[51] Int. Cl.$^4$ .......................... B05D 1/36; B05D 7/00; B32B 27/00

[52] U.S. Cl. .................................... 428/290; 428/288; 428/296; 524/502; 524/501; 525/186; 427/407.1; 427/412.3

[58] Field of Search ............... 427/385.5, 388.4, 393.5, 427/482.1, 412.3; 428/394, 500, 516, 517, 288, 290, 296

[56] References Cited

U.S. PATENT DOCUMENTS

| | | | |
|---|---|---|---|
| 4,018,729 | 4/1977 | Faucher et al. | 260/17 R |
| 4,325,856 | 4/1982 | Ishikawa et al. | 523/201 |
| 4,387,183 | 6/1983 | Francis | 525/54.23 |
| 4,423,118 | 12/1983 | Corbett et al. | 428/514 |
| 4,436,789 | 3/1984 | Davis et al. | 524/413 X |
| 4,460,747 | 7/1984 | Horak et al. | 525/197 |
| 4,474,928 | 10/1984 | Hoening et al. | 525/186 |
| 4,503,111 | 3/1985 | Jaeger et al. | 428/195 |
| 4,522,967 | 6/1985 | Sheldon et al. | 524/377 |
| 4,532,187 | 7/1985 | Hoening et al. | 428/457 |
| 4,578,285 | 3/1986 | Viola | 427/209 |
| 4,582,877 | 4/1986 | Fairchok et al. | 525/186 |
| 4,678,833 | 7/1987 | McCreedy et al. | 525/66 |
| 4,686,144 | 8/1987 | Hupfer et al. | 428/421 |
| 4,737,410 | 4/1988 | Kantner | 524/516 X |

FOREIGN PATENT DOCUMENTS 2175516A 12/1986 United Kingdom .

OTHER PUBLICATIONS

The Dow Chemical Company, "PEOX Polymer".
DuPont, "Tyvek Spunbonded Olefin: A Guide to Properties and End Uses".
DuPont, "Tyvek Spunbonded Olefin: A Guide to Printing".
DuPont, "Tyvek Spunbonde) Olefin: A Guide to Converting".
DuPont, "Tyvek Spunbonded Olefin: A Guide to Ordering, Storing and Handling".

*Primary Examiner*—Michael Lusigna
*Attorney, Agent, or Firm*—Stacey L. Channing; William L. Baker

[57] ABSTRACT

Disclosed are coating compositions, coated articles made using said coating compositions and processes for preparing the same. More particularly disclosed are aqueous ink-receptive, water-based coatings which are smudgeproof and which will not wash off with water.

46 Claims, No Drawings

INK-RECEPTIVE, WATER-BASED, COATINGS

BACKGROUND OF THE INVENTION

This invention relates to coating compositions and coated articles and to processes for preparing the same.

While certain substrates are inherently receptive to certain later-applied materials, many are not. For instance, many substrates, such as those made of polyester and other plastics, cellulose acetate, spunbonded olefin and metal are not receptive to the aqueous inks used in ink jet, xerographic, air brush, hand marking or other printing methods. Such substrates are not readily wetted and tend to repel water-based ink solutions, causing the ink droplets to coalesce into larger drops or puddles. This limits the amount of ink that can be deposited on the substrate and has negative effects on the appearance and resolution of the printed substrates. Furthermore, there exists a problem of retention of the aqueous ink on the substrate, which can result in smudging as well as the printing flaking off or being actually washed away upon contact with water.

Accordingly, it is a principal object of this invention to provide a coating for a substrate, which coating is receptive to certain later-applied materials.

It is another object of the invention to provide such a coating which is receptive to aqueous ink.

It is a further object of the invention to provide such a coating which is capable of retaining the aqueous ink.

It is a still further object of the invention to provide such a coating which is smudgeproof and which will not wash off with water.

SUMMARY OF THE INVENTION

The problems of the prior art are overcome by the provision of a coating having receptivity for later-applied materials, e.g., a printable coating, for application to various substrates.

A coated article of the invention may be prepared by a process comprising the steps of:
(a) providing a substrate;
(b) coating at least one surface of said substrate with a coating composition formed by:
  (1) mixing an olefin copolymer containing pendant acid groups with a base capable of substantially neutralizing said acid groups and an aqueous liquid to form an aqueous solution; and
  (2) mixing the aqueous solution of (1) with an aqueous solution of a 2-oxazoline polymer; and
(c) drying said coating.

Preferably, the olefin copolymer comprises polyethylene acrylic acid copolymer and the 2-oxazoline polymer comprises polyethyloxazoline. In one embodiment of the invention, the coating composition is formed by mixing the aqueous solution of the olefin copolymer having pendant acid groups, which pendant acid groups have been substantially neutralized by the base capable of neutralizing acid groups, and the aqueous solution of the 2-oxazoline polymer with a hydrophilic latex comprising a carboxy functional acrylic ester polymer, said solutions and latex being miscible with each other. In order to increase the opacity of the coated article, the surface of the substrate which is to be coated with the coating composition may first be coated with a pigment base coating and then overcoated with said coating composition.

DESCRIPTION OF THE PREFERRED EMBODIMENT

A coated article of the invention is produced by the steps comprising:
(a) providing a substrate;
(b) coating at least one surface of said substrate with an aqueous coating composition comprising an olefin copolymer containing substantially neutralized pendant acid groups and a 2-oxazoline polymer; and
(c) drying said coating.

What is meant herein by a 2-oxazoline polymer is defined in U.S. Pat. No. 4,678,833, the teachings of which are incorporated herein by reference. The preferred 2-oxazoline polymer of the invention is polyethyloxazoline having a molecular weight ranging from 1,000 to 1,000,000, with a molecular weight of approximately 500,000 being preferred. Polyethyloxazoline is produced by the cationic ring-opening polymerization of 2-ethyl-2-oxazoline. Polyethyloxazoline is available from Dow Chemical Company, Midland, Michigan, and sold under the trademark "PEOX". The aqueous coating composition of the invention is preferably formed by mixing a solution of a 2-oxazoline polymer in an aqueous liquid with a solution of an olefin copolymer containing substantially neutralized pendant acid groups in an aqueous liquid. The solution of the 2-oxazoline polymer in an aqueous liquid preferably comprises between 10–30 weight percent polyethyloxazoline and between 70–90 weight percent water.

As used herein, the term aqueous liquid is meant to include water as well as a fluid comprising substantially water plus one or more organic components.

The preferred olefin copolymer containing pendant acid groups comprises polyethylene acrylic acid copolymer where the weight percent acrylic acid ranges from 10 to 30 weight percent and more preferably is 20 weight percent. Other suitable olefin copolymers containing pendant acid groups include ethylene methacrylic acid copolymer and the like. In order for the olefin copolymer having pendant acid groups to go into solution with an aqueous liquid and thus be mixed in that form with the aqueous solution of the 2-oxazoline polymer, it is necessary to add a base capable of substantially neutralizing the acid groups of the olefin copolymer. Suitable bases include ammonia and ammonia derivatives, alkali metal hydroxides such as sodium hydroxide and potassium hydroxide, and amines. In order to reduce water sensitivity, a preferred base, such as ammonium hydroxide, will evaporate when the coating is dried. In this case, the olefin copolymer will regain its original level of hydrophobicity once the coating is dried. The preferred base, ammonium hydroxide, is preferably mixed with water to form an aqueous solution and then this aqueous solution of ammonium hydroxide is mixed with an aqueous liquid and the olefin copolymer containing pendant acid groups. The aqueous solution of ammonium hydroxide preferably comprises between 25–30 weight percent ammonium hydroxide and between 70–75 weight percent water. The aqueous solution of the olefin copolymer containing substantially neutralized pendant acid groups and the base is preferably formed by mixing between 20–30 weight percent polyethylene acrylic acid copolymer, between 70–75 weight percent water and between 1–5 weight percent aqueous solution of ammonium hydroxide.

The aqueous coating composition of the invention comprising a 2-oxazoline polymer and an olefin copolymer containing substantially neutralized pendant acid groups preferably comprises between 1 to 50 and more preferably 5 to 30 weight percent of the 2-oxazoline polymer and between 50 to 99 and more preferably 70 to 95 weight percent of the olefin copolymer containing substantially neutralized pendant acid groups, said weight percents being based on the weight of the 2-oxazoline polymer and the olefin copolymer. Accordingly, once dried, the coating preferably comprises between 1 to 50 and more preferably 5 to 30 dry weight percent of the 2-oxazoline polymer and between 50 to 99 and more preferably 70 to 95 dry weight percent of the olefin copolymer containing pendant acid groups, which pendant acid groups may or may not be substantially neutralized depending on the base used to neutralize the acid groups in solution, said weight percents being based on the weight of the 2-oxazoline polymer and the olefin copolymer.

For certain applications, such as for making an aqueous ink-receptive coating for a spunbonded olefin which will not wash off with water, the coating composition preferably further comprises a carboxy functional acrylic ester polymer. It appears that in order to obtain the right amount of wettability, e.g., aqueous ink receptivity, with just the olefin copolymer having pendant acid groups and the 2-oxazoline polymer in the dried coating, it is necessary to use a large amount of the 2-oxazoline polymer, e.g., at least 20 to 50 percent by weight of the coating composition, said weight percents being based on the weight of the 2-oxazoline polymer and the olefin copolymer. Unfortunately, this large quantity of the 2-oxazaline polymer may cause the coating to be able to be washed off with water. Since a carboxy functional acrylic ester polymer will blend with the olefin copolymer to make the coating more wettable, by adding the carboxy functional acrylic ester polymer to the aqueous coating composition, preferably in the form of a latex, a lesser amount of the 2-oxazoline polymer needs to be used in order to obtain the right wetting properties. Even though the carboxy functional acrylic ester polymer, similar to the 2-oxazoline copolymer, blends with the olefin copolymer to make it more wettable, once the coating is dried, the carboxy functional acrylic ester polymer will not go into solution with water and thus a coating comprising a 2-oxazoline polymer, an olefin copolymer having pendant acid groups and a carboxy functional acrylic ester polymer will not wash off with water. Suitable carboxy functional acrylic ester polymers include polyacrylate/acrylonitrile copolymers, polyacrylates, polyethylene vinyl acetates,polyvinyl acetates/acrylates, etc. and the preferred carboxy functional acrylic ester polymer comprises a polymer comprising acrylic acid, acrylonitrile and styrene.

The aqueous coating composition of the invention comprising a 2-oxazoline polymer, an olefin copolymer having substantially neutralized pendant acid groups and a carboxy functional acrylic ester polymer is preferably formed by mixing together: (1) an aqueous solution formed by mixing an olefin copolymer containing pendant acid groups with a base capable of substantially neutralizing said acid groups and an aqueous liquid; (2) an aqueous solution of a 2-oxazoline polymer; and (3) a hydrophilic latex comprising a carboxy functional acrylic ester polymer, said solutions and latex being miscible with each other. The hydrophilic latex, polymerized through free radical polymerization, preferably comprises between 45–50 weight percent of a polymer comprising acrylic acid, acrylonitrile and styrene; 1–5 weight percent surfactant and 45–50 weight percent water. A surfactant, preferably an anionic surfactant, is preferably included in the latex in order to better enable the carboxy functional acrylic ester to be dispersed in water. The aqueous coating composition of the invention comprising a 2-oxazoline polymer, an olefin copolymer containing substantially neutralized pendant acid groups and a carboxy functional acrylic ester polymer preferably comprises between 10 to 20 weight percent of the 2-oxazoline polymer; between 60 to 80 weight percent of the olefin copolymer containing substantially neutralized pendant acid groups; and between 10 to 20 weight percent of the carboxy functional acrylic ester polymer, said weight percents being based on the weight of the 2-oxazoline polymer, the olefin copolymer and the carboxy functional acrylic ester polymer. Accordingly, once dried, the coating preferably comprises between 10 to 20 dry weight percent of the 2-oxazoline polymer; between 60 to 80 dry weight percent of the olefin copolymer containing pendant acid groups, which pendant acid groups may or may not be substantially neutralized depending upon the base used to neutralize the acid groups in solution; and between 10 to 20 dry weight percent of the carboxy functional acrylic ester polymer, said weight percents being based on the weight of the 2-oxazoline polymer, the olefin copolymer and the carboxy functional acrylic ester polymer.

The aqueous coating compositions of the invention preferably comprise between 2–75 and more preferably 2–35 weight total solids. The coating compositions of the invention can be modified by the incorporation of fillers, thickeners and other such modifiers. Types and amounts of these materials can easily be determined by those skilled in the art. The coatings of the invention preferably comprise between 0–70 weight percent filler, examples of suitable fillers being fumed silica, clay, silicates and the like.

The aqueous coating composition of the invention can be coated onto any backing material (substrate) to which it will adhere when dry, such as paper, plastic, spunbonded olefins, nonwovens and metals. In making aqueous ink-receptive coatings, the coating weight is preferably about 0.01 to 5 ounces per square yard and the thickness of said coating is preferably between 0.01 to 5 mils. The coating composition can be applied to the substrate by any of the conventional coating techniques, such as reverse roller coating, rod coating, or air knife techniques. The coated substrate is dried by conventional means, for instance by air drying or by drying in a forced air oven.

When it is desired to increase the opacity of the coated substrate, the surface of the substrate which is to be coated with the coating composition is first coated with a pigment base coating composition, the pigment coated substrate is dried and then the pigment coated substrate is overcoated with the coating composition of the invention. The pigment base coating must have good adhesion to the substrate as well as good adhesion to the overcoating. Suitable pigments for the pigment base coating include titanium dioxide, satin white, calcium carbonate, talc, blanc fixe, zinc oxide, zinc sulfide, barium sulfate, colored pigments, etc., with the preferred pigment being titanium dioxide. The pigment base coating composition preferably comprises the pigment; water; a dispersing agent, such as tetra sodium pyrophosphate to enable the pigment to be disposed in water; and a thickener, such as methylcellulose, to keep the pigment from settling out; and a suitable binder for the pigment.

The invention is further illustrated by the following non-limiting example:

EXAMPLE

A white pigment dispersion in water is prepared by mixing together 80.0 lbs. of deionized water, 0.8 lbs. of tetra sodium pyrophosphate (a dispersing agent), 200 lbs. of rutile grade titanium dioxide pigment and 31.2 lbs. of a solution containing 5 weight percent methyl cellulose (thickener) and 9 weight percent water. The viscosity of said white pigment dispersion ranges between 600 to 1500 centipoise measured on a #3 Brookfield spindle at 60 rpm. A pigment base coating composition is formed by mixing 342.3 lbs. of this white pigment dispersion with 8.3 lbs. deionized water, 1 lb. Acrysol ASE-75, an acrylic copolymer thickener obtained from Rohm & Haas, and 398.4 lbs. of an ammoniated solution of Dow Chemical's Primacor 5980. Primacor 5980 is a polyethylene acrylic acid copolymer in pellet form having an 80/20 weight percent ratio of ethylene to acrylic acid. The ammoniated solution of Primacor 5980 is formed by mixing 25 weight percent Primacor 5980 with 72 weight percent water and 3 weight percent of a solution containing 28 weight percent ammonium hydroxide and 72 weight percent water. The purpose for the Primacor 5980 in the pigment base coating composition is to obtain good adhesion of the base coating to the substrate.

A Tyvek ® substrate is coated with this pigment base coating composition. Tyvek ® is obtained from Dupont - Wilmington, Delaware, and is a spunbonded olefin made from high-density polyethylene fibers. The pigment coated substrate is dried at between 150° F. to 225° F. in an oven for approximately three minutes and the dry pigment coating weight is approximately 0.25 oz/yd$^2$. The drying temperature is particularly important since too high a temperature can cause permanent heat distortion in the substrate. The dry pigment coating is then overcoated with an aqueous ink-receptive coating prepared by mixing together 595 lbs. of the above-described ammoniated solution of Primacor 5980; 66.3 lbs. of Hycar 2600×84; 159.8 lbs. of a solution containing 20 weight percent PEOX 500 and 80 weight percent deionized water; and 28.9 lbs. of deionized water. Hycar 2600×84 is a lightly crosslinked, heat reactive latex obtained from B. F. Goodrich and believed to be a 48 weight percent solids dispersion of a polymer comprised substantially of acrylic acid, acrylonitrile and styrene in water containing an anionic surfactant. PEOX 500 is obtained from Dow Chemical and is a polyethyloxazoline resin having a molecular weight of 500,000. The solution of PEOX 500 is made by mixing 240 lbs. of deionized water with 60 lbs. PEOX 500 resin. The aqueous ink-receptive overcoating is then dried at 150° F. to 225° F. in an oven for approximately 3 minutes and the dry overcoating weight is approximately 0.40 oz/yd$^2$.

The coated substrate obtained from the above procedure is calendered and then an aqueous-based ink is applied to the coated substrate by a printing method such as air brush, ink jet, xerographic, hand marking etc.

While this invention has been described with reference to its preferred embodiments, other embodiments can achieve the same result. Variations and modifications of the present invention will be obvious to those skilled in the art and it is intended to cover in the appended claims all such modifications and equivalents as fall within the spirit and scope of this invention.

I claim:

1. A coating composition comprising:
   at least 5 weight percent of a polymer of a 2-oxazoline;
   at least 50 weight percent of polyethylene acrylic acid copolymer; and
   an aqueous liquid, said weight percents being based on the weight of the 2-oxazoline polymer and the polyethylene acrylic acid copolymer.

2. The composition of claim 1 wherein the polymer of a 2-oxazoline comprises polyethyloxazoline.

3. The composition of claim 1 further comprising filler in an amount of between 0–70 weight percent of the solids of the composition.

4. The composition of claim 1 wherein the weight percent ratio of ethylene to acrylic acid comprises an 80/20 ratio.

5. The composition of claim 1 further comprising a base capable of substantially neutralizing the acid groups of the polyethylene acrylic acid copolymer.

6. The composition of claim 5 wherein said base will evaporate when said composition is dried.

7. The composition of claim 6 wherein said base comprises ammonium hydroxide.

8. The composition of claim 5 further comprising a carboxy functional acrylic ester polymer.

9. The composition of claim 8 wherein the carboxy functional acrylic ester polymer comprises a polymer comprising acrylic acid, acrylonitrile and styrene.

10. The composition of claim 8 further comprising a surfactant.

11. The composition of claim 1 wherein said composition comprises between 2–35 weight percent solids.

12. The composition of claim 3 wherein the filler is selected from the group consisting of fumed silica, clay, and silicates.

13. The composition of claim 5 comprising between 5 to 30 weight percent of the 2-oxazoline polymer and between 70 to 95 weight percent of polyethylene acrylic acid copolymer, the pendant acid groups of which have been substantially neutralized by the base, said weight percents being based on the weight of the 2-oxazoline polymer and the polyethylene acrylic acid copolymer.

14. The composition of claim 8 comprising between 10 to 20 weight percent of the 2-oxazoline polymer; between 60 to 80 weight percent of polyethylene acrylic acid copolymer, the pendant acid groups of which have been substantially neutralized by the base, and between 10 to 20 weight percent of the carboxy functional acrylic ester polymer, said weight percents being based on the weight of the 2-oxazoline polymer, the polyethylene acrylic acid copolymer and the carboxy functional acrylic ester polymer.

15. A coating composition comprising:
   at least 5 weight percent of a polymer of a 2-oxazoline;
   at least 50 weight percent of an olefin copolymer containing substantially neutralized pendant acid groups;
   a base capable of neutralizing acid groups;

a carboxy functional acrylic ester polymer;
a surfactant; and
an aqueous liquid, said weight percents being based on the weight of the 2-oxazoline polymer, the olefin copolymer and the carboxy functional acrylic ester polymer.

16. The composition of claim 1 formed by mixing a solution of the polymer of a 2-oxazoline in an aqueous liquid with a solution of the polyethylene acrylic acid copolymer in an aqueous liquid.

17. The composition of claim 16 wherein the aqueous solution of the polyethylene acrylic acid copolymer further comprises a base which substantially neutralizes the acid groups of the polyethylene acrylic acid copolymer.

18. The composition of claim 17 wherein said base will evaporate when said composition is dried.

19. The composition of claim 18 wherein said base comprises ammonium hydroxide.

20. The composition of claim 17 wherein the aqueous solution of the polyethylene acrylic acid copolymer and the base is formed by mixing the polyethylene acrylic acid copolymer and an aqueous liquid with an aqueous solution of ammonium hydroxide.

21. The composition of claim 20 wherein the aqueous solution of ammonium hydroxide comprises between 25–30 weight percent ammonium hydroxide and 70–75 weight percent water.

22. The composition of claim 17 wherein the polymer of a 2-oxazoline comprises polyethyloxazoline.

23. The composition of claim 22 wherein the solution of polyethyloxazoline comprises between 10–30 weight percent polyethyloxazoline and between 70–90 weight percent water.

24. The composition of claim 8 formed by mixing a solution of the polymer of a 2-oxazoline in an aqueous liquid, a solution of the base capable of substantially neutralizing the acid groups of the polyethylene acrylic acid copolymer and the polyethylene acrylic acid copolymer which pendant acid groups have been substantially neutralized by said base in an aqueous liquid; and a hydrophilic latex comprising a carboxy functional acrylic ester polymer, said solutions and latex being miscible with each other.

25. The composition of claim 24 wherein the hydrophilic latex further comprises a surfactant.

26. The composition of claim 25 wherein the hydrophilic latex comprises 45–50 weight percent of a polymer comprising acrylic acid, acrylonitrile and styrene; 1–5 weight percent surfactant and 45–50 weight percent water.

27. A composition comprising:
at least 5 weight percent of a polymer of a 2-oxazoline;
at least 50 weight percent of an olefin copolymer containing pendant acid groups; and
a carboxy functional acrylic ester polymer, said weight percents being based on the weight of the 2-oxazoline polymer, the olefin copolymer and the carboxy functional acrylic ester polymer.

28. The composition of claim 27 wherein the polymer of a 2-oxazoline comprises polyethyloxazoline and the olefin copolymer containing pendant acid groups comprises polyethylene acrylic acid copolymer.

29. A process for producing a coated article having aqueous ink applied to it comprising the steps of:
(a) providing a substrate;
(b) coating at least one surface of said substrate with a coating composition formed by:
(1) mixing an olefin copolymer containing pendant acid groups with a base capable of substantially neutralizing said acid groups and an aqueous liquid to form an aqueous solution; and
(2) mixing said aqueous solution with an aqueous solution of a 2-oxazoline polymer;
said coating composition comprising at least 5 weight percent 2-oxazoline polymer and at least 50 weight percent olefin copolymer containing pendant acid groups, said weight percents being based on the weight of the 2-oxazoline polymer and the olefin copolymer;
(c) drying said coating; and
(d) applying an aqueous-based ink to the coated substrate.

30. The process of claim 29 wherein the substrate comprises a sheetlike substrate selected from the group consisting of paper, plastic, spunbonded olefins, nonwovens and metal.

31. The process of claim 29 wherein the olefin copolymer comprises polyethylene acrylic acid copolymer and the 2-oxazoline polymer comprises polyethyloxazoline.

32. The process of claim 29 wherein said base will evaporate when said coating is dried in step (c).

33. The process of claim 32 wherein said base comprises ammonium hydroxide.

34. The process of claim 29 wherein the coating composition comprises between 5 to 30 weight percent of the 2-oxazoline polymer and between 70 to 95 weight percent of the olefin copolymer containing substantially neutralized pendant acid groups, said weight percents being based on the weight of the 2-oxazoline polymer and the olefin copolymer.

35. The process of claim 29 wherein in step (b), the coating composition is formed by mixing the aqueous solution of the olefin copolymer with the aqueous solution of the 2-oxazoline polymer and with a hydrophilic latex comprising a carboxy functional acrylic ester polymer, said solutions and latex being miscible with each other.

36. The process of claim 35 wherein the coating composition comprises between 10 to 20 weight percent of the 2-oxazoline polymer, between 60 to 80 weight percent of the olefin copolymer, and between 10 to 20 weight percent of the carboxy functional acrylic ester polymer, said weight percents being based on the weight of the 2-oxazoline polymer, the olefin copolymer and the carboxy functional acrylic ester polymer.

37. The process of claim 35 wherein the hydrophilic latex further comprises a surfactant.

38. The process of claim 37 wherein the hydrophilic latex comprises a polymer comprising acrylic acid, acrylonitrile and styrene; a surfactant; and water.

39. The process of claim 29 wherein in step b, filler is added to the mixture of the aqueous solution of the olefin copolymer and the aqueous solution of the 2-oxazoline polymer in an amount of between 0–70 weight percent of the solids of the composition.

40. The process of claim 29 wherein prior to coating at least one surface of the substrate in step (b), said surface of said substrate is coated with a- pigment base coating.

41. A coated article having aqueous ink applied to it prepared by a process comprising the steps of:
(a) providing a substrate;

(b) coating at least one surface of said substrate with a coating composition formed by:
  (1) mixing an olefin copolymer containing pendant acid groups with a base capable of substantially neutralizing said acid groups and an aqueous liquid to form an aqueous solution; and
  (2) mixing said aqueous solution with an aqueous solution of a 2-oxazoline polymer;
said coating composition comprising at least 5 weight percent 2-oxazoline polymer and at least 50 weight percent olefin copolymer containing pendant acid groups, said weight percents being based on the weight of the 2-oxazoline polymer and the olefin copolymer;
(c) drying said coating; and
(d) applying an aqueous-based ink to the coated substrate.

42. The coated article of claim 41 wherein the coating composition comprises between 5 to 30 weight percent of the 2-oxazoline polymer and between 70 to 95 weight percent of the olefin copolymer containing substantially neutralized pendant acid groups, said weight percents being based on the weight of the 2-oxazoline polymer and the olefin polymer.

43. The coated article of claim 41 wherein in step (b), the coating composition is formed by mixing the aqueous solution of the olefin copolymer with the aqueous solution of the 2-oxazoline polymer and with a hydrophilic latex comprising a carboxy functional acrylic ester polymer, said solutions and latex being miscible with each other.

44. The coated article of claim 43 wherein the coating composition comprises between 10 to 20 weight percent of the 2-oxazoline polymer, between 60 to 80 weight percent of the olefin copolymer, and between 10 to 20 weight percent of the carboxy functional acrylic ester polymer, said weight percents being based on the weight of the 2-oxazoline polymer, the olefin copolymer and the carboxy functional acrylic ester polymer.

45. The coated article of claim 41 wherein said coating comprises an aqueous ink-receptive coating.

46. The coated article of claim 45 wherein prior to coating at least one surface of the substrate in step (b), said surface of said substrate is coated with a pigment base coating.

* * * * *